United States Patent [19]
Amberg et al.

[11] 3,955,699
[45] May 11, 1976

[54] CLOSE NESTING, TAMPERPROOF CONTAINER CLOSURE

[75] Inventors: Stephen W. Amberg, St. James; Rodney E. Ludder, Glen Head, both of N.Y.

[73] Assignee: Owens-Illinois, Inc., Toledo, Ohio

[22] Filed: July 29, 1974

[21] Appl. No.: 492,771

Related U.S. Application Data

[63] Continuation of Ser. No. 333,972, Feb. 20, 1973, abandoned.

[52] U.S. Cl. .......................... 215/246; 215/277
[51] Int. Cl.² .................................... B65D 41/54
[58] Field of Search ............... 215/246, 277, 307; 206/487

[56] References Cited
UNITED STATES PATENTS

| | | | |
|---|---|---|---|
| 2,223,017 | 11/1940 | Abrams | 215/246 |
| 2,790,285 | 4/1957 | Pike | 215/246 |
| 2,967,383 | 1/1961 | Rumsey | 206/497 |
| 3,187,478 | 6/1965 | Kirkpatrick | 215/246 |
| 3,344,912 | 10/1967 | Sternaw | 215/246 |
| 3,358,902 | 12/1967 | Emmert | 215/246 |
| 3,488,913 | 1/1970 | Burgess | 206/497 |
| 3,640,417 | 2/1972 | Sakurai | 215/246 |

*Primary Examiner*—William Price
*Assistant Examiner*—Ro E. Hart
*Attorney, Agent, or Firm*—Thomas A. Meehan; Edward J. Holler

[57] ABSTRACT

A close nesting, single element, easy-opening tamperproof closure for wide-mouth containers, especially externally beaded, round, nestable cup-like containers formed from paper or plastic, the closure comprising a central panel adapted to substantially span the mouth of the associated container and formed from paper, a non-shrinkable plastic material, or the like, and further comprising a frusto-conically shaped skirt formed from a double-ended blank of a plastic material which is highly oriented in the direction extending circumferentially of the closure, the overlapped ends of the blank being heat sealed or otherwise joined to one another inwardly of the outermost of the ends thereof, the inner smaller diameter of the skirt being adhesively joined to the outer periphery of the central panel, the skirt being shrinkable, upon the application of heat thereto when the closure is in place over the mouth of a filled container, to shrink into tight engagement with the mouth of the container, the outermost free end of the closure skirt serving as a pull tab by which the skirt may be conveniently separated from the panel when it is desired to open the container and to give a clearly visual indication that the container has been opened upon the first opening thereof. Such a closure may be provided in either flush-style or plug-style embodiments.

7 Claims, 5 Drawing Figures

CLOSE NESTING, TAMPERPROOF CONTAINER CLOSURE

This is a continuation of application Ser. No. 333,972 filed Feb. 20, 1973 and now abandoned.

BACKGROUND OF THE INVENTION

In the packaging of beverages and solid or semi-solid food products it is quite desirable, for reasons of sanitation, to close the container by means which will be permanently deformed or disfigured upon the first opening of the container to provide a readily apparent indication that the container has been opened, such closures commonly being referred to as tamperproof closures. Among the more popular types of tamperproof closures used in the trade are the single element, rolled on metallic closures which are applied to the threaded neck portions of glass containers and which have their inwardly projecting mating threads rolled against the glass neck by external tooling. However, such closures may not readily be applied to wide-mouth containers formed from relatively thin materials, such as nestable paper containers or nestable thermoformed plastic containers, because such containers are not ordinarily provided with a threaded portion, and because the mouths of such containers, because of their large size and the thinness of the surrounding walls, would not withstand the magnitude of the forces required to deform portions of the skirt of a metallic closure by rolling in place. Also, such closures are generally of a non-nestable configuration, and large numbers thereof, especially in wide-mouth sizes would occupy large volumes of space during shipment and storage.

Another known type of tamperproof closuring concept, which is applicable to wide-mouth containers or to containers formed with relatively non-rigid mouths, involves the use of a pair of separate elements, a closure element, generally of non-nestable configuration, with an outwardly projecting bead or flange at the bottom or the skirt thereof and a band formed from an elastic or heat-shrinkable material which is separately inserted over the mouth of the closed container to securely engage the flange or bead of the closure. Such a closuring concept, however, may not readily be applied to the nestable paper or thermoformed plastic containers which have been widely used for many years in the packaging of dairy products such as ice-cream, cottage cheese, yogurt or the like, as existing types of container filling and closing machines are not equipped to mechanically perform the extra step of affixing a tamperproof band to a previously closed container.

GENERAL DESCRIPTION OF THE INVENTION

In accordance with the present invention, however, there is provided a single element, tamperproof closure, which may be closely nested with like closures during shipment and storage and which may readily be applied to wide-mouth containers formed from paper or thermoformed plastic containers, and such closures may be mechanically applied to such containers on a rapid basis by known types of filling and closure applying machines without the need for extensive rebuilding or modification of such machines. Such a closure comprises a central panel, formed from paperboard or a non-heat shrinkable plastic sheet, which substantially spans the mouth opening of the associated container, and, attached to the outermost periphery of the central panel, an annular skirt extending outwardly and downwardly therefrom, the skirt being formed by convolutely winding a strip formed from a heat shrinkable thermoplastic material into a closed configuration. By the application of heat to the skirt portion of such a closure after it has been telescoped over the open mouth of a filled container, the skirt will shrink into tight engagement with the underlying portion of the container sidewall. Close nesting of like closures and easy insertion of such closures onto the open tops of filled containers is facilitated by the frustoconical configuration of the skirt portions thereof, and rapid removal of a closure from a filled container may be facilitated by joining the innermost end of the blank from which the skirt portion is formed to the outermost overlapped end at a location disposed somewhat inwardly from such outermost end, thereby leaving an accessible free end which may be grasped, as a tab, to tear the skirt from the central panel. This, of course, will be quite visible, thereby qualifying such closure as a tamperproof closure.

Accordingly, it is an object of the present invention to provide an improved closure. More particularly, it is an object of the present invention to provide a tamperproof closure for wide-mouth containers. Even more particularly, it is an object of the present invention to provide a nestable single element, easy-opening tamperproof closure, in either a flush-style or plug-style configuration, that may readily be applied to a wide-mouth container of thinwall construction in a nestable, cup-like configuration in which the mouth of such container is surrounded by an outwardly projecting bead or rim.

For a further understanding of the present invention and the objects thereof, attention is directed to the drawing, to the following description thereof, to the detailed description of the invention and to the appended claims.

DETAILED DESCRIPTION OF THE INVENTION

Figure 1:
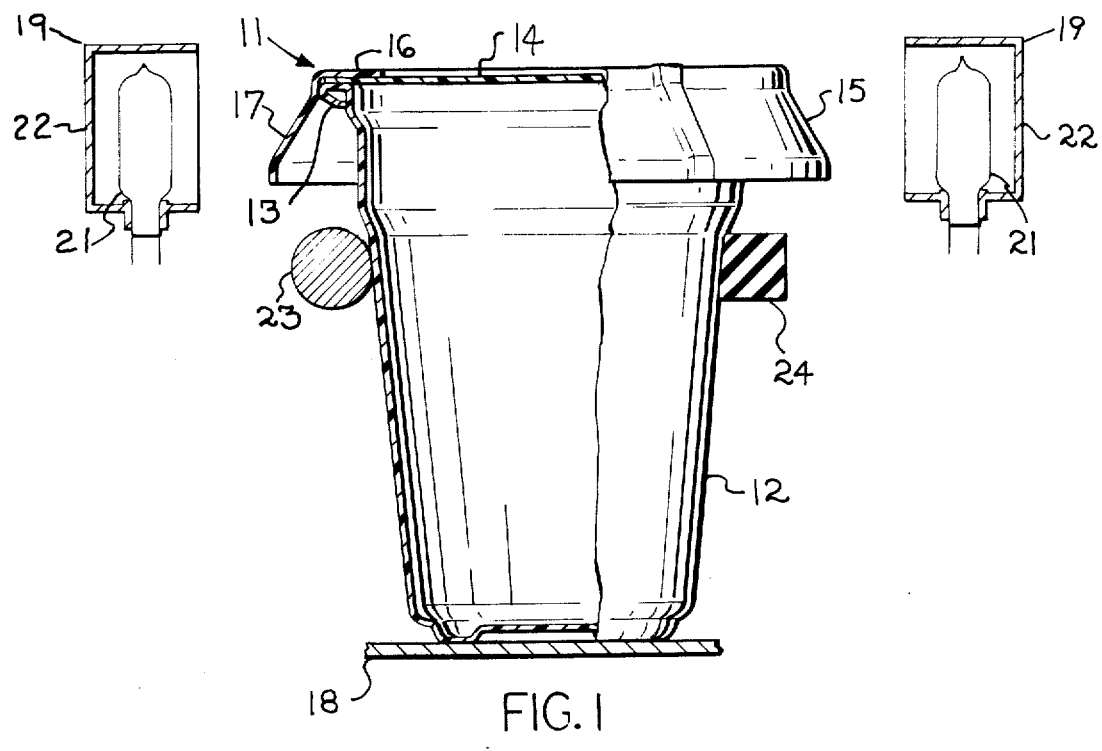
FIG. 1 is an elevational view, partly in section, of a preferred embodiment of a flush-type closure in accordance with the present invention, the closure being shown in its initially applied relationship to an associated container of a nestable cup-like configuration.

A flush-style lid in accordance with the present invention is indicated generally by reference character 11 in FIG. 1. Lid 11 is shown in place over the upper open end or mouth of a nestable, cup-like container 12, the mouth of the container being surrounded by an outwardly projecting bead 13. Container 12 is shown as comprising a known type of single piece plastic container which may be formed by thermoforming from a sheet of thermoplastic material such as polyethylene or polystyrene, in known fashion, and should be considered as having been filled with the product to a packaged therein before closure 11 is inserted thereover. However, the packaged product is not shown in the drawing for the sake of clarity. While the closure of the invention is being described in relationship to a thermo-formed plastic container, it is to be understood that it may also be applied to other types of wide-mouth containers, especially those which have an outwardly projecting rim or bead surrounding the container at or near the mouth thereof. Known types of nestable, cup-like containers fabricated from paperboard or other sheet-like materials and injection molded nestable cup-like containers are specifically within the contemplated uses for the closure of the present invention.

Closure 11, as is shown in FIG. 1, is of two-piece construction, the pieces comprising, respectively, a disc-like central panel 14 which substantially spans the mouth of container 12 and an annular skirt 15, an innermost annular planar portion of which is adhesively bonded or otherwise joined to an outermost annular planar portion of panel 14 before the closure is inserted over container 12, so that the closure comprises but a single element to be assembled to the container. Central panel 14, which may be considered to be of circular configuration because most types of associated nestable containers have circular mouth openings, may be formed from any thin, sheet-like material such as paperboard or plastic, it being noted only that such material, if plastic, should be of such a nature that it will not be subject to substantial shrinkage upon exposure to heat.

Figure 3:
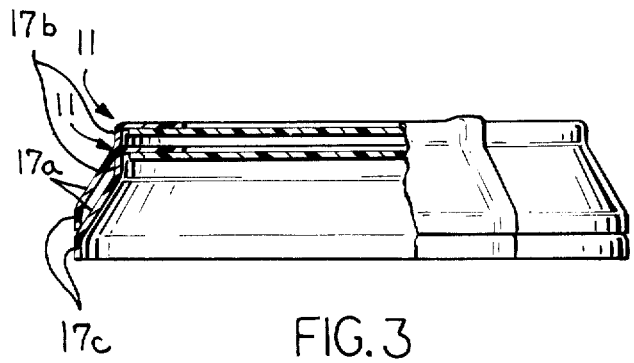
FIG. 3 is an elevational view, partly in section, of a pair of like closures of the type shown in FIG. 1 showing the nested relationship that they may occupy during shipment and storage.

The skirt 15 of closure 11 has a radially inwardly extending flange portion 16 which provides an annular planar surface to which an annular planar surface portion of disc 14 may be adhesively or otherwise joined. Skirt 15 further comprises a skirt portion 17 integrally formed with flange portion 16 and extending downwardly therefrom, so as to surround the beaded mouth of container 12 to an appreciable depth. So that like closures 11 will be nestable, as is shown in FIG. 3, skirt portion 17 is outwardly tapered for a major portion 17a of its length as it extends downwardly from flange portion 16, it being provided with short vertical sections 17b and 17c at the top and bottom thereof to maintain minimum spacing between adjacent closures in a nested stack.

Figure 2:
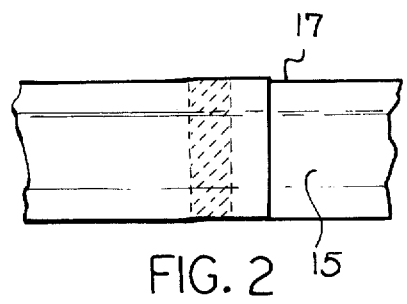
FIG. 2 is a fragmentary elevational view of a portion of the closure of FIG. 1.

Skirt 15 is fabricated from an elongate blank or strip of a thermoplastic material having a high degree of orientation or heat-shrinkability extending longitudinally thereof, that is, extending circumferentially of the finished closure for reasons which will later be quite apparent. A strip formed from cellular or expanded general purpose polystyrene has been found to be particularly well suited for the practice of the invention because of its low cost, pleasing appearance and the ease with which it may be manually removed, by tearing, when it is desired to open the associated container. However, other heat shrinkable thermoplastic materials may also be used. In any event, the skirt 15 may be formed by convolutely winding a rectangular strip of such material into a cylindrical configuration, by joining the overlapped ends together, as by heat sealing, preferably at a location somewhat inward from the radially outermost of the overlapped ends, as is shown by the shaded area in FIG. 2, by inserting the cylindrically wound strip over a metallic mandrel or form whose external surface has the configuration of the internal surface of the skirt 15 as it appears in the drawing, by exposing the cylindrically wound strip to heat while it is on the mandrel or form to cause it to shrink to the shape thereof, and by removing the so shrunken shape from the mandrel. The central panel 14 may be joined to the skirt 15 either before or after the so-formed skirt is removed from the mandrel or form. These steps correspond to those utilized in the manufacture of nestable drinking cups according to the invention described in U.S. Pat. No. 3,854,583 by Stephen W. Amberg and Thomas E. Doherty, which is assigned to the assignee of this application. Alternatively, it is contemplated that a satisfactory skirt of nestable configuration can be formed, without such a shrinking step, by directly winding a crescent-shaped strip around a frusto-conically shaped mandrel, in a manner now extensively employed in the manufacture of nestable drinking cups and containers from paper or other non-shrinkable materials.

A closure 11 as heretofore described may be manually inserted over a filled container, as would be the situation in a food carry-out business where such closures could be used for closing cups filled with coffee or other beverage. Alternatively, a multiplicity of such closures may be mechanically applied, in sequence, to a multiplicity of containers by means of known types filling and capping machines which normally comprise mechanical means to consecutively separate closures in a nested stack thereof and to drop them over filled containers being conveyed under the stack of closures by conveying means. This is the arrangement that may be considered to be depicted in FIG. 1 where member 18, shown fragmentarily, may be considered to be the conveying flight of an endless conveyor which is caused to move, by conventional means not shown, at a right angle to the plane of the drawing. In either case, there is provided means adjacent the closure, when it is in position on the mouth of the associated container, to heat the skirt 15 of the closure to cause it to shrink into tightly conforming engagement around the beaded or rimmed mouth of the container thereby causing the skirt 15 to assume the configuration shown in FIG. 4.

In the case of closures incorporating skirts formed of a material which is opaque to infra-red radiation, the shrinkage thereof can be effected very expeditiously by infra-red radiation means 19, shown as comprising an infra-red electrical bulb 21 mounted in a concave reflective device 22 disposed with its open side directed toward the closure skirt. Continuous filling and capping machines may be modified to affix such closures quite inexpensively, it being necessary to provide only a few of such radiation means along the path of travel of the conveying flight of the conveyor, preferably disposed in opposed banks on opposite sides of the conveying path. The container with the closure in place may be caused to rotate as it passes by such radiation means to expose all portions of the skirt 15 uniformly to the heating effects thereof, by providing a fixed metal rail 23 adapted to engage one side of container 12 and a moving endless rubber belt, such as a V-belt, having a contact flight 24 adapted to engage the other side of container 12 directly opposite the point of contact of rail 23. Alternatively, the shrinking of skirt 15 of closure 11 about the open mouth of container 12 can be effected by directing a stream of heated air or other compressible fluid thereover, and this method of heating would be independent of the infra-red radiation absorption characteristics of the material used in making the skirt.

Figure 4:
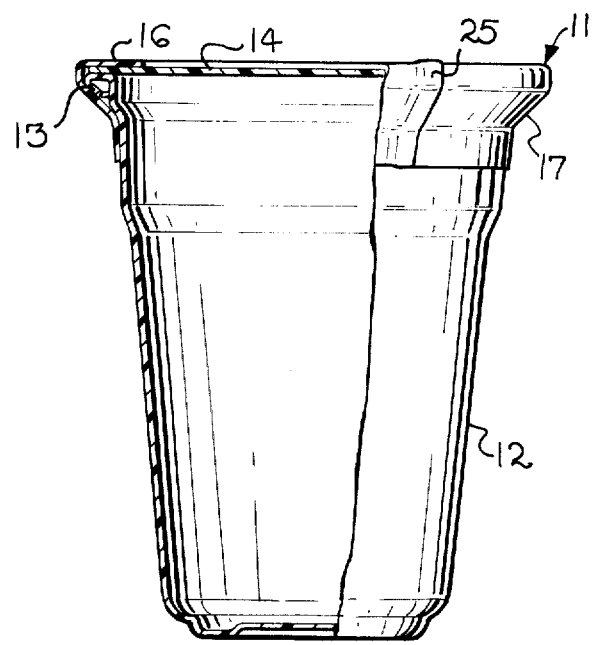
FIG. 4 is an elevational view, partly in section, of the closure of FIG. 1 in relationship with the associated container.

As is shown in FIG. 4, there is a very high degree of interference between the mouth of container 12 and the shrunken skirt portion 17 of closure skirt 15, the interference arising primarily because of the presence of outwardly projecting bead 13 of the container and secondarily because of the tapered or nestable shape of the container in the region covered by the closure. Because of this degree of interference, a closure having a skirt formed from a relatively non-strechable material such as general purpose polystyrene, cannot be removed without tearing the closure. Thus, the first user or purchaser of a filled container will be alerted, by the appearance of the closure skirt, of any previous opening of or tampering with the filled container.

Figure 5:
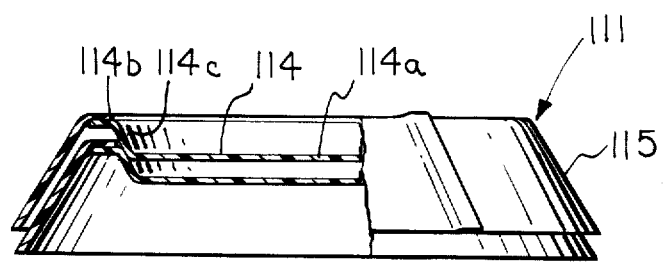
FIG. 5 is a view similar to FIG. 3 showing the nesting relationship between a preferred embodiment of like plug-style closures in accordance with the present invention.

As has previously been explained, the ends of the blank from which the skirt 15 of closure 11 is formed are joined to one another at a location somewhat circumferentially inwardly of the outermost of the overlapped ends. This will provide an accessible, non-adhered free end, identified by reference numeral 25 in FIG. 4, which serves as a graspable tab by which the closure skirt may be readily torn from the central panel when it is desired to open the filled container, tearing normally occuring generally along the sharp radius juncture between the flange portion 16 and the skirt portion 17 of closure skirt 15.

Where it is desired to only partially remove the contents of a filled container, the container 12 may be closed by a reclosable or plug-style closure such as that shown in FIG. 5, wherein like closures are shown in nested relationship. The central panel piece 114 of such closure has a downwardly offset interior portion 114a which is connected to an upwardly positioned surrounding annular flange portion 114b by a short downwardly and inwardly extending tapered portion 114c. The piece comprising portions 114a, 114b, and 114c may readily be formed in a single piece by thermoforming a sheet of thermoplastic material. Because the tapered portions 114c of such closure pieces may be utilized to establish a minimum stacking space between like closures in a nested stack, the heat shrinkable skirt pieces 115 of such closures need not be provided with vertical sections corresponding to portions 17b and 17c of skirt 17 of closure 11.

The best mode known to us to carry out this invention has been described above in terms sufficiently full, clear concise and exact as to enable any person skilled in the art to make and use the same. It is to be understood, however, that it is within our contemplation that certain modifications of the above-described mode of practicing the invention can be made by a skilled artisan without departing from the scope of the invention and it is, therefore, desired to limit the invention only in accordance with the appended claims.

We claim:

1. A nestable container closure comprising an imperforate central panel adapted to lie across the open mouth of a container; and an annular skirt attached along its inner periphery to the outer periphery of the central panel and extending outwardly and downwardly from the central panel, the skirt thereby being adapted to surround a finite depth of the wall portion of the container which defines such open mouth, like closures being closely nestable within one another, said annular skirt comprising a convolutely wound elongate strip of expanded heat shrinkable polystyrene, the ends of which are joined to one another in an overlapped seam, said ends being joined to one another at a location that is circumferentially inwardly of the radially outermost of such overlapped ends, thereby providing a manually graspable free end located between the top and bottom edges of the annular skirt and below the central panel by which the closure skirt may be torn from the central panel when it is desired to open a closed container, tearing occurring at the juncture of the skirt and central panel, the central panel being non-heat shrinkable when exposed to the type of heat that will cause the annular skirt to shrink, whereby the closure may be secured to the container, when in place over the mouth thereof, by the application of heat to the annular skirt.

2. A plug-style container closure according to claim 1 wherein the central panel comprises a major central portion and a surrounding annular portion, said annular portion lying in a plane, said major central portion being disposed substantially downwardly from said plane.

3. A flush-style container closure according to claim 1 wherein all portions of the central panel are substantially coplanar.

4. The combination of an open-mouthed container and a container closure of the type described in claim 1, the closure being in place over the open mouth of the container, the skirt of the closure having been shrunken, by the application of heat thereto, to securely engage the portion of the container wall surrounding the open mouth thereof.

5. The combination according to claim 4 wherein said container is of nestable configuration with the mouth thereof being located at the larger of the ends thereof.

6. The combination according to claim 4 wherein all portions of the central panel of the closure remain above the mouth of the container in the closed container.

7. The method of closing an open-mouth container comprising the steps of:
inserting a closure of the type described in claim 1 over the container mouth with the skirt of the closure surrounding the wall of the container below the mouth to a finite depth thereof;
and exposing the closure skirt to a source of heat to shrink the skirt into tight engagement with the portion of the container wall which it surrounds.

* * * * *